United States Patent
Aghasadeghi et al.

(10) Patent No.: US 12,325,131 B2
(45) Date of Patent: Jun. 10, 2025

(54) CONSTRAINED MANIPULATION OF OBJECTS

(71) Applicant: Boston Dynamics, Inc., Waltham, MA (US)

(72) Inventors: Navid Aghasadeghi, Boston, MA (US); Alfred Anthony Rizzi, Waltham, MA (US); Gina Fay, Lexington, MA (US); Robert Eugene Paolini, Cambridge, MA (US)

(73) Assignee: Boston Dynamics, Inc., Waltham, MA (US)

( * ) Notice: Subject to any disclaimer, the term of this patent is extended or adjusted under 35 U.S.C. 154(b) by 188 days.

(21) Appl. No.: 17/644,642

(22) Filed: Dec. 16, 2021

(65) Prior Publication Data

US 2022/0193898 A1    Jun. 23, 2022

Related U.S. Application Data

(60) Provisional application No. 63/128,573, filed on Dec. 21, 2020.

(51) Int. Cl.
*B25J 9/16* (2006.01)
*B25J 13/08* (2006.01)
(Continued)

(52) U.S. Cl.
CPC .......... *B25J 9/1628* (2013.01); *B25J 13/088* (2013.01); *G05B 19/4155* (2013.01); *B62D 57/02* (2013.01); *G05B 2219/40269* (2013.01)

(58) Field of Classification Search
CPC ...... B25J 9/1628; B25J 13/088; B25J 9/1664; B25J 9/1633; B25J 9/1679;
(Continued)

(56) References Cited

U.S. PATENT DOCUMENTS

| | | | |
|---|---|---|---|
| 6,088,628 A | 7/2000 | Watanabe et al. | |
| 6,522,952 B1 * | 2/2003 | Arai | B25J 9/1679 |
| | | | 700/258 |

(Continued)

FOREIGN PATENT DOCUMENTS

| | | | |
|---|---|---|---|
| KR | 20090113084 A | 10/2009 | |
| KR | 20130000496 A | 1/2013 | |

(Continued)

OTHER PUBLICATIONS

Chung, Woojin, Door-Opening Control of a Service Robot Using the Multifingered Robot Hand, (2009), IEEE Transactions on Industrial Electronics, vol. 56, p. 3975-3983 (Year: 2009).*

(Continued)

*Primary Examiner* — Wade Miles
*Assistant Examiner* — Mohammed Yousef Abuelhawa
(74) *Attorney, Agent, or Firm* — Knobbe, Martens, Olson & Bear, LLP

(57) ABSTRACT

A computer-implemented method executed by data processing hardware of a robot causes the data processing hardware to perform operations. The robot includes an articulated arm having an end effector engaged with a constrained object. The operations include receiving a measured task parameter set for the end effector. The measured task parameter set includes position parameters defining a position of the end effector. The operations further include determining, using the measured task parameter set, at least one axis of freedom and at least one constrained axis for the end effector within a workspace. The operations also include assigning a first impedance value to the end effector along the at least one axis of freedom and assigning a second impedance value to the end effector along the at least one constrained axis. The operations include instructing the articulated arm to move the end effector along the at least one axis of freedom.

22 Claims, 9 Drawing Sheets

(51) Int. Cl.
B62D 57/02 (2006.01)
G05B 19/4155 (2006.01)

(58) Field of Classification Search
CPC .............. G05B 19/4155; G05B 19/42; G05B 2219/40269; G05B 2219/40517; G05B 2219/39346; G05B 2219/40062; B62D 57/02

See application file for complete search history.

(56) References Cited

U.S. PATENT DOCUMENTS

| | | | |
|---|---|---|---|
| 9,205,887 | B2 | 12/2015 | Dariush |
| 9,364,951 | B1 | 6/2016 | De Sapio et al. |
| 9,514,542 | B2 | 12/2016 | Matsumoto et al. |
| 9,687,983 | B1 | 6/2017 | Prats |
| 9,987,744 | B2 | 6/2018 | Prats |
| 10,086,517 | B2 | 10/2018 | Touma et al. |
| 10,166,676 | B1 | 1/2019 | Hudson et al. |
| 10,402,503 | B2 | 9/2019 | Shapiro et al. |
| 2005/0104548 | A1* | 5/2005 | Takenaka ............ B62D 57/032 318/568.12 |
| 2009/0105880 | A1* | 4/2009 | Okazaki ................ B25J 9/1633 700/258 |
| 2010/0228397 | A1 | 9/2010 | Weber |
| 2011/0202068 | A1* | 8/2011 | Diolaiti .................. A61B 34/30 606/130 |
| 2012/0072023 | A1 | 3/2012 | Ota et al. |
| 2013/0054029 | A1 | 2/2013 | Huang et al. |
| 2015/0273689 | A1 | 10/2015 | Ouchi |
| 2016/0089788 | A1* | 3/2016 | Nammoto ............. B25J 9/1633 700/250 |
| 2017/0217021 | A1 | 8/2017 | Hoffman et al. |
| 2017/0259433 | A1* | 9/2017 | Takeuchi ............... B25J 13/085 |
| 2017/0275026 | A1 | 9/2017 | Szarski et al. |
| 2017/0326728 | A1* | 11/2017 | Prats .................... H04N 13/204 |
| 2018/0250822 | A1 | 9/2018 | Shimodaira et al. |
| 2018/0297204 | A1 | 10/2018 | Krasny et al. |
| 2019/0143517 | A1 | 5/2019 | Yang et al. |
| 2020/0001457 | A1 | 1/2020 | Limone et al. |
| 2020/0039082 | A1 | 2/2020 | Kapoor et al. |
| 2020/0094405 | A1 | 3/2020 | Davidson et al. |
| 2020/0306965 | A1* | 10/2020 | Nakasu ................. B25J 9/1697 |
| 2020/0306998 | A1 | 10/2020 | Talebi et al. |
| 2020/0316782 | A1 | 10/2020 | Chavez et al. |
| 2021/0293099 | A1 | 9/2021 | Carnegie et al. |
| 2021/0339390 | A1 | 11/2021 | Gaschler |
| 2022/0032454 | A1 | 2/2022 | Yang et al. |
| 2022/0193894 | A1 | 6/2022 | Barry et al. |
| 2022/0193906 | A1 | 6/2022 | Barry et al. |
| 2023/0234229 | A1 | 7/2023 | Fay et al. |

FOREIGN PATENT DOCUMENTS

| | | |
|---|---|---|
| WO | 2010136961 A1 | 12/2010 |
| WO | WO 2020/190166 A1 | 9/2020 |
| WO | WO 2022/140151 A1 | 6/2022 |
| WO | WO 2022/140190 A1 | 6/2022 |
| WO | WO 2022/140205 A1 | 6/2022 |
| WO | WO 2023/140929 A1 | 7/2023 |

OTHER PUBLICATIONS

Nair Ashvin et al: "Overcoming Exploration in Reinforcement Learning with Demonstrations", 2018 IEEE International Conference on Robotics and Automation (ICRA), IEEE, May 21, 2018 (May 21, 2018), pp. 6292-6299, XP033403793, DOI: 10.1109/ICRA.2018.8463162 [retrieved on Sep. 11, 2018] the whole document, 8 pages.

Alexey Skrynnik et al: "Forgetful Experience Replay in Hierarchical Reinforcement Learning from Demonstrations", arxiv.org, Cornell University Library, 201 Olin Library Cornell University Ithaca, NY 14853, Jun. 17, 2020 (Jun. 17, 2020), XP081697976, 37 pages.

International Search Report and Written Opinion dated Mar. 25, 2022 for corresponding International Application No. PCT/US2021/063776; 10 pages.

International Search Report and Written Opinion dated Apr. 4, 2022 for related Application No. PCT/US2021/064105 in 48 pages.

International Search Report and Written Opinion dated Apr. 12, 2022 for related Application No. PCT/US2021/064236 in 22 pages.

International Search Report and Written Opinion dated Mar. 23, 2023 in Application No. PCT/US2022/051066, 9 pages.

* cited by examiner

CONSTRAINED MANIPULATION OF OBJECTS

CROSS REFERENCE TO RELATED APPLICATION

This U.S. patent application claims priority under 35 U.S.C. § 119(e) to U.S. Provisional Application 63/128,573, filed on Dec. 21, 2020. The disclosure of this prior application is considered part of the disclosure of this application and is hereby incorporated by reference in its entirety.

TECHNICAL FIELD

This disclosure relates to constrained manipulation of objects using a robotic arm.

BACKGROUND

Robotic arms are increasingly being used in constrained or otherwise restricted environments to perform a variety of tasks or functions. These robotic arms often need to efficiently manipulate constrained objects, such as doors or switches, without requiring large computations. As robotic arms become more prevalent, there is a need for arm path planning that quickly determines and executes a path associated with a constrained object.

SUMMARY

One aspect of the disclosure provides a computer-implemented method. When executed by data processing hardware of a robot, the computer-implemented method causes the data processing hardware to perform operations. The robot includes an articulated arm having an end effector engaged with a constrained object. The operations include receiving a measured task parameter set for the end effector. The measured task parameter set includes position parameters defining a position of the end effector. The operations further include determining, using the measured task parameter set, at least one axis of freedom and at least one constrained axis for the end effector within a workspace. The operations also include assigning a first impedance value to the end effector along the at least one axis of freedom and assigning a second impedance value to the end effector along the at least one constrained axis. Additionally, the operations include instructing the articulated arm to move the end effector along the at least one axis of freedom.

Aspects of the disclosure may include one or more of the following optional features. In some implementations, determining the at least one axis of freedom and the at least one constrained axis includes determining a task space model for the constrained object using the measured task parameter set. In some embodiments, the operations further include storing at least a portion of the measured task parameter set in a task buffer as task parameter records. In further embodiments, storing at least a portion of the measured task parameter set includes comparing at least one measured parameter from the measured parameter task set to a recorded parameter of one of the task parameter records of the task buffer and generating a new task parameter record when a difference between the at least one measured parameter and the recorded parameter satisfies a recording threshold. In even further embodiments, the measured parameter and the recorded parameter each include a respective position parameter and/or a respective velocity parameter.

In other further embodiments, the operations further include evaluating the position parameters of the task parameter records to determine the at least one axis of freedom associated with the task parameter records. In other further embodiments, the operations further include evaluating the task parameter records to determine whether the end effector is engaged with the constrained object.

Another aspect of the disclosure provides a robot. The robot includes an articulated arm, data processing hardware in communication with the articulated arm, and memory hardware in communication with the data processing hardware. The articulated arm has an end effector for engaging a constrained object. The memory hardware stores instructions that when executed on the data processing hardware cause the data processing hardware to perform operations. The operations include receiving a measured task parameter set for the end effector. The measured task parameter set includes position parameters defining a position of the end effector. The operations further include determining, using the measured task parameter set, at least one axis of freedom and at least one constrained axis for the end effector within a workspace. The operations also include assigning a first impedance value to the end effector along the at least one axis of freedom and assigning a second impedance value to the end effector along the at least one constrained axis. Additionally, the operations include instructing the articulated arm to move the end effector along the at least one axis of freedom.

Aspects of the disclosure may include one or more of the following optional features. In some implementations, determining the at least one axis of freedom and the at least one constrained axis includes determining a task space model for the constrained object using the measured task parameter set. In some examples, the operations further include storing at least a portion of the measured task parameter set in a task buffer as task parameter records. In further examples, storing at least a portion of the measured task parameter set includes comparing at least one measured parameter from the measured parameter task set to a recorded parameter of one of the task parameter records of the task buffer and generating a new task parameter record when a difference between the at least one measured parameter and the recorded parameter satisfies a recording threshold. In even further examples, the measured parameter and the recorded parameter each include a respective position parameter and/or a respective velocity parameter.

In other further examples, the operations further include evaluating the position parameters of the task parameter records to determine the at least one axis of freedom associated with the task parameter records. In other further examples, the operations further include evaluating the task parameter records to determine whether the end effector is engaged with the constrained object.

Yet another aspect of the disclosure provides a computer program product. The computer program product is encoded on a non-transitory computer readable storage medium connected to a robot. The robot includes an articulated arm having an end effector for engaging a constrained object. The computer program product includes instructions that when executed by a data processing apparatus cause the data processing apparatus to perform operations. The operations include receiving a measured task parameter set for the end effector. The measured task parameter set includes position parameters defining a position of the end effector. The operations further include determining, using the measured task parameter set, at least one axis of freedom and at least one constrained axis for the end effector within a workspace.

The operations also include assigning a first impedance value to the end effector along the at least one axis of freedom and assigning a second impedance value to the end effector along the at least one constrained axis. Furthermore, the operations include instructing the articulated arm to move the end effector along the at least one axis of freedom.

Aspects of the disclosure may include one or more of the following optional features. In some implementations, determining at the least one axis of freedom and the at least one constrained axis includes determining a task space model for the constrained object using the measured task parameter set. In some embodiments, the operations further include storing at least a portion of the measured task parameter set in a task buffer as task parameter records. In further embodiments, storing at least the portion of the measured task parameters set includes comparing at least one measured parameter from the measured parameter task set to a recorded parameter of one of the task parameter records of the task buffer and generating a new task parameter record when a difference between the at least one measured parameter and the recorded parameter exceeds a recording threshold. In even further embodiments, the measured parameter and the recorded parameter each include a respective position parameter and/or a respective velocity parameter.

In other further embodiments, the operations further include evaluating the position parameters of the task parameter records to determine the at least one axis of freedom associated with the task parameter records. In other further embodiments, the operations further include evaluating the task parameter records to determine whether the end effector is engaged with the constrained object.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Many robots include multi-axis articulable appendages configured to execute complex movements for completing tasks, such as material handling or industrial operations (e.g., welding, gluing, and/or fastening). These appendages, also referred to as manipulators, typically include an end-effector or hand attached at the end of a series appendage segments or portions, which are connected to each other by one or more appendage joints. The appendage joints cooperate to configure the appendage in a variety of poses P within a space associated with the robot. Here, the term "pose" refers to the position and orientation of the appendage. For example, the pose P of the appendage may be defined by coordinates (x, y, z) of the appendage within a workspace (Cartesian space), and the orientation may be defined by angles (Ox, Oy, Oz) of the appendage within the workspace. In use, the appendage may need to manipulate partially constrained objects by applying forces to move the object along or about one or more unconstrained axes.

Figure 1A:
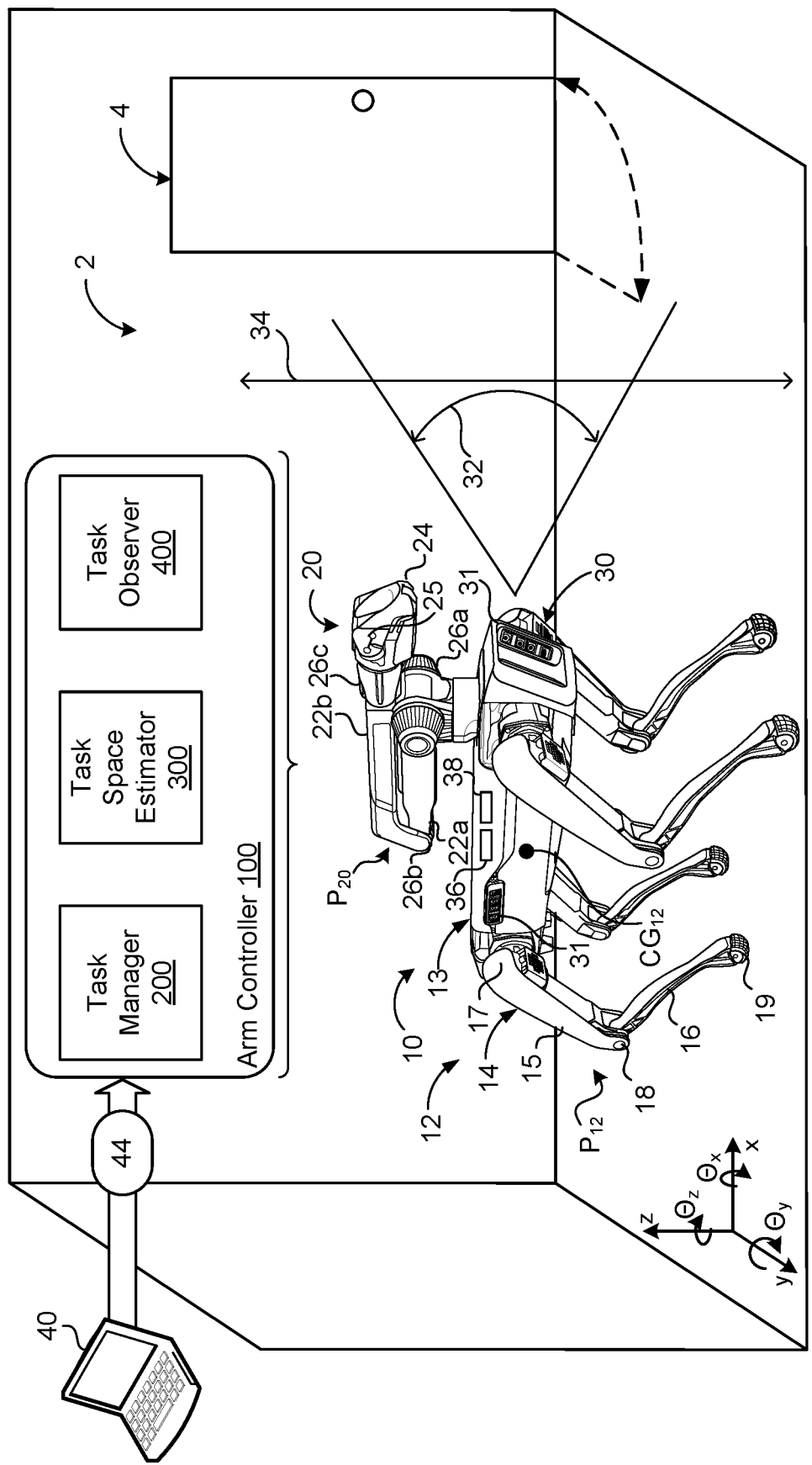
FIG. 1A is a schematic view of an example robot executing an arm controller for executing manipulation tasks with an arm of the robot.

Referring to FIG. 1, a robot or robotic device 10 includes a base 12 having a body 13 and two or more legs 14. Each leg 14 may have an upper leg portion 15 and a lower leg portion 16. The upper leg portion 15 may be attached to the body 13 at an upper joint 17 (i.e., a hip joint) and the lower leg portion 16 may be attached to the upper leg portion 15 by an intermediate joint 18 (i.e., a knee joint). Each leg 14 further includes a contact pad or foot 19 disposed at a distal end of the lower leg portion 16, which provides a ground-contacting point for the base 12 of the robot 10.

In some implementations, the robot 10 further includes one or more appendages, such as an articulated arm 20 or manipulator disposed on the body 13 and configured to move relative to the body 13. Moreover, the articulated arm 20 may be interchangeably referred to as a manipulator, an appendage arm, or simply an appendage. In the example shown, the articulated arm 20 includes two arm portions 22, 22a, 22b rotatable relative to one another and the body 13. However, the articulated arm 20 may include more or less arm portions 22 without departing from the scope of the present disclosure. A third arm portion 24 of the articulated arm, referred to as an end effector 24 or hand 24, may be interchangeably coupled to a distal end of the second portion 22b of the articulated arm 20 and may include one or more actuators 25 for gripping/grasping objects 4.

The articulated arm 20 includes a plurality of joints 26, 26a-26c disposed between adjacent ones of the arm portions 22, 24. In the example shown, the first arm portion 22a is attached to the body 13 of the robot 10 by a first two-axis joint 26a, interchangeably referred to as a shoulder 26a. A single-axis joint 26b connects the first arm portion 22a to the second arm portion 22b. The second joint 26b includes a single axis of rotation and may be interchangeably referred to as an elbow 26b of the articulated arm 20. A second two axis joint 26c connects the second arm portion 22b to the hand 24, and may be interchangeably referred to as a wrist 26c of the articulated arm 20. Accordingly, the joints 26 cooperate to provide the articulated arm 20 with five degrees of freedom (i.e., five axes of rotation). While the illustrated example shows a five-axis articulated arm 20, the principles of the present disclosure are applicable to robotic arms having any number of axes. Furthermore, the principles of the present disclosure are applicable to robotic arms mounted to different types of bases, such as mobile bases including one or more wheels or stationary bases.

The robot 10 also includes a vision system 30 with at least one imaging sensor or camera 31, each sensor or camera 31 capturing image data or sensor data of the environment 2 surrounding the robot 10 with an angle of view 32 and within a field of view 34. The vision system 30 may be configured to move the field of view 34 by adjusting the angle of view 32 or by panning and/or tilting (either independently or via the robot 10) the camera 31 to move the field of view 34 in any direction. Alternatively, the vision system 30 may include multiple sensors or cameras 31 such that the vision system 30 captures a generally 360-degree field of view around the robot 10. The camera(s) 31 of the vision system 30, in some implementations, include one or more stereo cameras (e.g., one or more RGBD stereo cameras). In other examples, the vision system 30 includes one or more radar sensors such as a scanning light-detection and ranging (LIDAR) sensor, or a scanning laser-detection and ranging (LADAR) sensor, a light scanner, a time-of-flight sensor, or any other three-dimensional (3D) volumetric image sensor (or any such combination of sensors). The vision system 30 provides image data or sensor data derived from image data captured by the cameras or sensors 31 to the data processing hardware 36 of the robot 10. The data processing hardware 36 is in digital communication with memory hardware 38 and, in some implementations, may be a remote system. The remote system may be a single computer, multiple computers, or a distributed system (e.g., a cloud environment) having scalable/elastic computing resources and/or storage resources.

In the example shown, the robot 10 executes an arm controller 100 on the data processing hardware 36 of the robot. In some implementations, at least a portion of the arm controller 100 executes on a remote device 40 in communication with the robot 10. For instance, a model 342 of the constrained task space may be computed on a remote device 40 and a control system executing on the robot 10 may receive the model and determine the limited torque requests using the model. Optionally, the arm controller 100 may execute on a remote device 40 and the remote device 40 may provide an object manipulation task request 44 to the robot 10 to move/control the articulated arm 20 for manipulating a constrained object 4.

The arm controller 100 of the robot 10 controls moving the articulated arm 20 between arm poses $P_{20}$. For instance, the articulated arm 20 may need to move from a start pose $P_{20}$ to a target pose $P_{20}$ when the robot 10 is executing the task request 44. For instance, in a scenario when the robot 10 needs to open a door while navigating in an environment, the robot arm controller 100 will need to move the articulated arm 20 from a first pose $P_{20}$ where the door is in a closed position to a second pose $P_{20}$ where the door is in an open position.

The arm controller 100 may include a task manager 200, a task space estimator 300, and a task observer 400. The task manager 200 receives or obtains a task request 44 for manipulating a constrained object 4 and generates task instructions 222 (FIG. 2A) including impedance parameters 238 (e.g., stiffness) (FIG. 2A) and path parameters 248 (e.g., force, position) (FIG. 2A) for executing the task request 44. The task space estimator 300 is configured to receive a measured task parameter set 322 (e.g., position, force, speed) (FIGS. 2A-3) from the robot arm 20 and generate a task space model 342 (FIG. 3) defining the degrees of freedom and/or constraints associated with the task request 44. The task observer 400 evaluates the measured task parameter set 322 of the robot arm 20 during execution of the task request 44 to determine whether the robot arm 20 is successfully executing the task request 44.

Movements and poses of the robot 10 and robot appendages 14, 20 may be defined in terms of a robot workspace based on a Cartesian coordinate system. In the example of the robot 10 provided in FIG. 1A, the robot workspace may be defined by six dimensions including the translational axes x, y, z and rotational axes $\Theta_x$, $\Theta_y$, $\Theta_z$ (SE(3) manifolds). As discussed below, actions of the robot 10 and/or the robot arm 20 may be defined using lower-dimensional spaces or manifolds including less axes than the number of axes (six) of the workspace. For example, the task request 44 may be constrained to a single axis within the workspace so that path parameters 248 can be efficiently computed along the single axis. Appendages 14, 20 of the robot 10 may also be described in terms of a joint space, which refers to a space representing all possible combinations of joint configurations of a robot appendage, and is directly related to the number of degrees of freedom of the robot appendage. For instance, a robot arm having n degrees of freedom will have an n-dimensional joint space. In the present example, the articulated arm has five degrees of freedom defining a five-dimensional joint space.

Figure 1B:
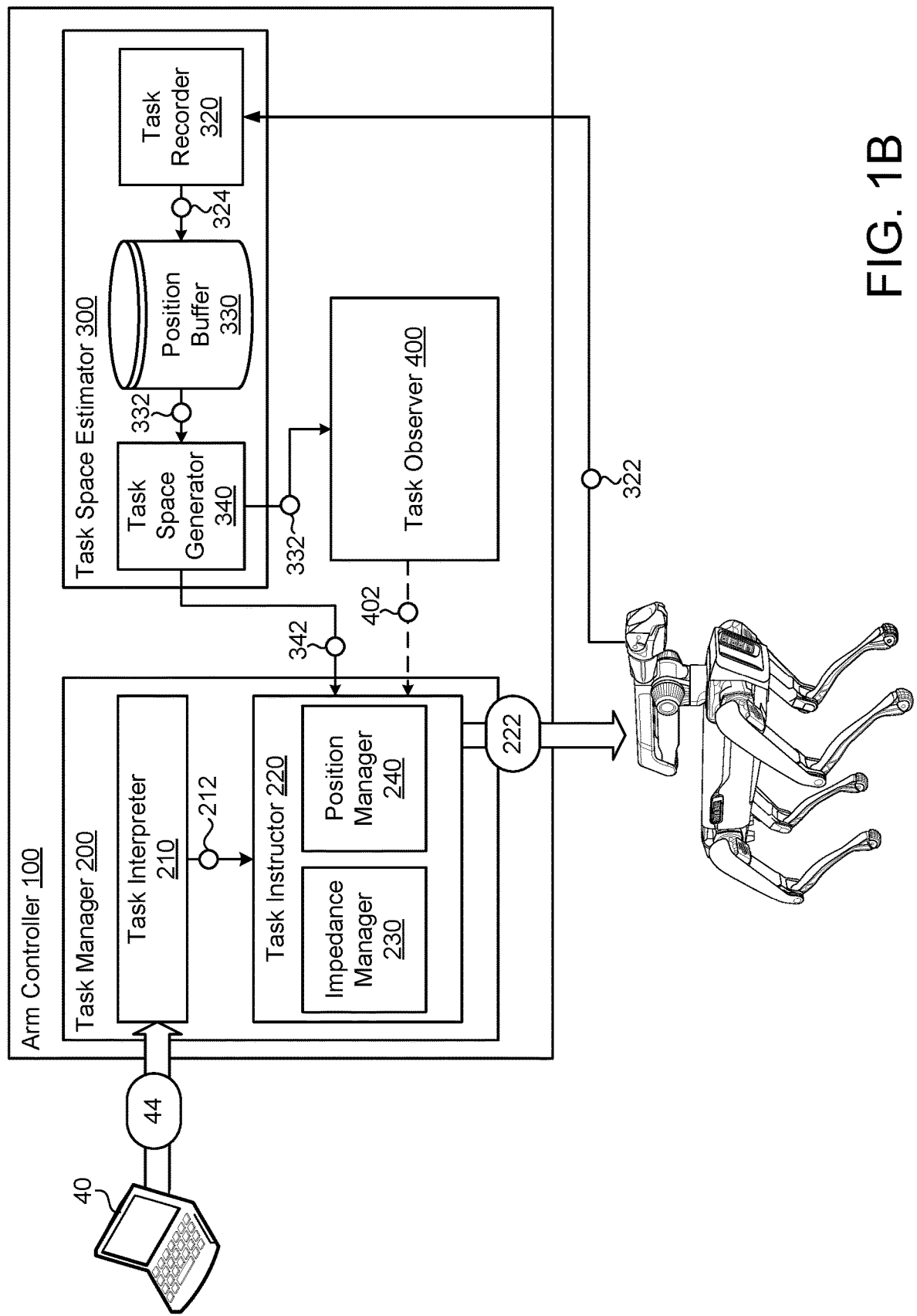
FIG. 1B is a schematic view of the arm controller of FIG. 1A.

With reference to FIG. 1B, the task manager 200 includes a task interpreter 210 configured to receive or obtain task requests 44 from the remote device 40 and generate translated task requests 212 executable by the arm controller 100 to move the robot arm 20. The task manager 200 further includes a task instructor 220 configured to generate task instructions 222 using the translated task request 212 and/or the task space model 342 provided by the task space estimator 300. Thus, as described later, the task manager 200 generally receives a task request 44 and generates task instructions 222 that comply with the task space model 342.

Figure 2A:
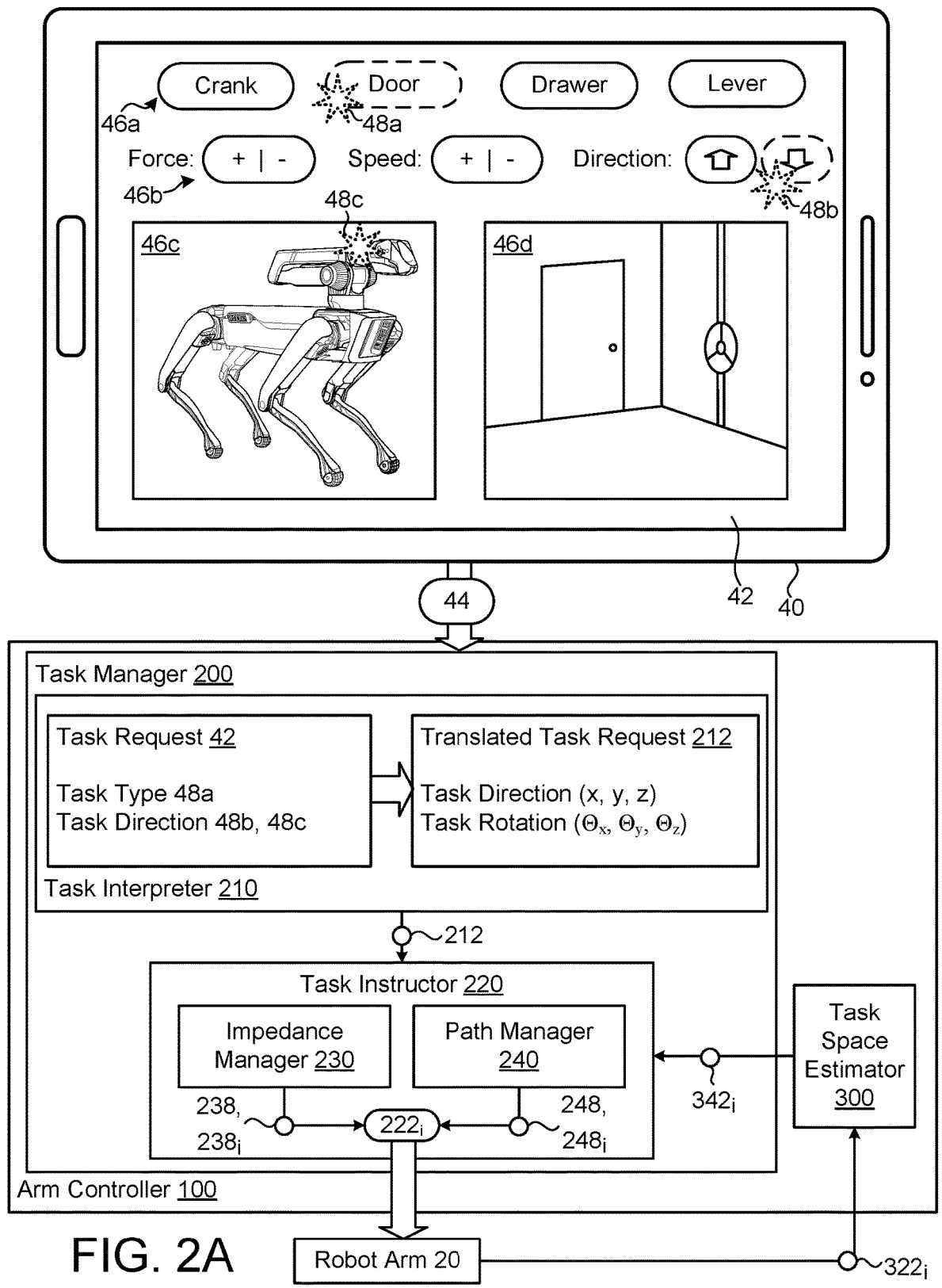
FIG. 2A is schematic view of a remote device and task manager of the arm controller of FIG. 1A.

FIG. 2A shows an example operation of the task interpreter 210 generating the translated task request 212 based on the task request 44 received or obtained from the remote device 40. A user may interact with a user interface 42 displayed on a screen in communication with the remote device 40 to select task characteristics 46, 46a-d for the task request 44. For example, the user interface 42 may graphically display one or more buttons 46a for defining the type of object 4 (e.g., crank, door, drawer, etc.) for manipulation and one or more buttons 46b for selecting task parameters (e.g., speed, force, direction, etc.). The user interface 42 may also include a force application window 46c including a graphical representation of the robot 10 or the robot arm 20. A user may use touch gestures to indicate a general direction for moving the robot arm 20 or applying force, such as an initial direction of movement for the arm 20 or initial direction for applying force. For example, a user may swipe to the left from the displayed end effector 24 to indicate a desired initial movement of the end effector 24 to the left. The user interface 42 also includes a task location window 46d for displaying a location in the robot environment 2 corresponding to the initial movement of the end effector 24. The task location window 46d may be based on the image data from the camera 31 of the robot 10. Thus, a user can select a location within the field of view 34 of the robot 10.

In the example of FIG. 2A, the user interface 42 is shown with user inputs or selection points 48-c corresponding to each of the task characteristics 46. For example, the inputs 48 include a first input 48a identifying the constrained task type 46a as being a door and a second input 48b selecting that task parameters 46b include moving the arm 20 in a downward or backward direction depending on the constrained task type 46a (e.g., a door would be backward, a switch would be downward). At a third input 48c, the user selects the right-hand side of the end effector 24 for applying the selected task parameters 46b. Thus, the task request 44 generally includes characteristics 46 for pulling a door handle in a backward direction using the end effector 24.

While presenting the user interface 42 with gesture-based buttons 46a, 46b and selection windows 46c, 46d simplifies user control of the robot arm 20 by presenting an intuitive interface, the task characteristics 46 included in the task request 44 may not be directly executable by the robot arm 20. Accordingly, the task interpreter 210 of the task manager 200 receives the task request 44 and translates the task characteristics 46 into translational and/or rotational coordinates based on the robot workspace. For example, the task interpreter 210 may translate the user-selected backward direction 48b associated with the task type 46a of opening a door into movements along the x-y plane of the workspace (FIG. 1). The translated task request 212 is then sent to the task instructor 220.

Referring to FIG. 1B, the task instructor 220 includes an impedance manager 230 for assigning the impedance parameters 238 to each Cartesian dimension of the end effector 24 and a path manager 240 for assigning instructed path parameters 248 to the end effector 24. The task instructor 220 generates task instructions 222 including the impedance parameters 238 and the path parameters 248. In FIG. 2A, the task instructor 220 receives the translated task request 212 and generates an initial iteration of task instructions $222_i$ for moving the robot arm 20 according to the task request 44. The initial iteration of the task instructions $222_i$ may be based on user-defined task parameters 238, 248 and/or the translated task request 212 since the task space model 342 associated with the task request 44 (i.e., the degrees of freedom associated with the task type 46a) is undefined. For example, the impedance manager 230 may assign a user-defined impedance setpoint 232 as the instructed impedance parameters $238_i$ until the task space estimator 300 has sufficient data about the task request 44 to define the task space model 342 for the task request 44. The path manager 240 may generate path parameters $248_i$ based on the directional and rotational coordinates of the translated task request 212 corresponding to the one or more of the user inputs 48a-48c. The initial task instructions $222_i$ are then sent to the robot arm 20 for initiating the task request 44.

Referring to FIG. 1B, the robot arm 20 includes one or more sensors that measure the position, force, and/or velocity parameters of the robot arm 20 after each iteration of the task instructions 222 and generate a corresponding measured task parameter set 322. Each iteration of the measured task parameter set 322 is sent to the task space estimator 300, which uses the measured task parameter set 322 to generate the task space model 342 associated with the task request 44. Additionally or alternatively, the task space estimator 300 may receive or obtain the path parameters 248 from the task instructor 220 to generate the task space model 342 using the same steps as described below with respect to the measured task parameter set 322.

Figure 3:
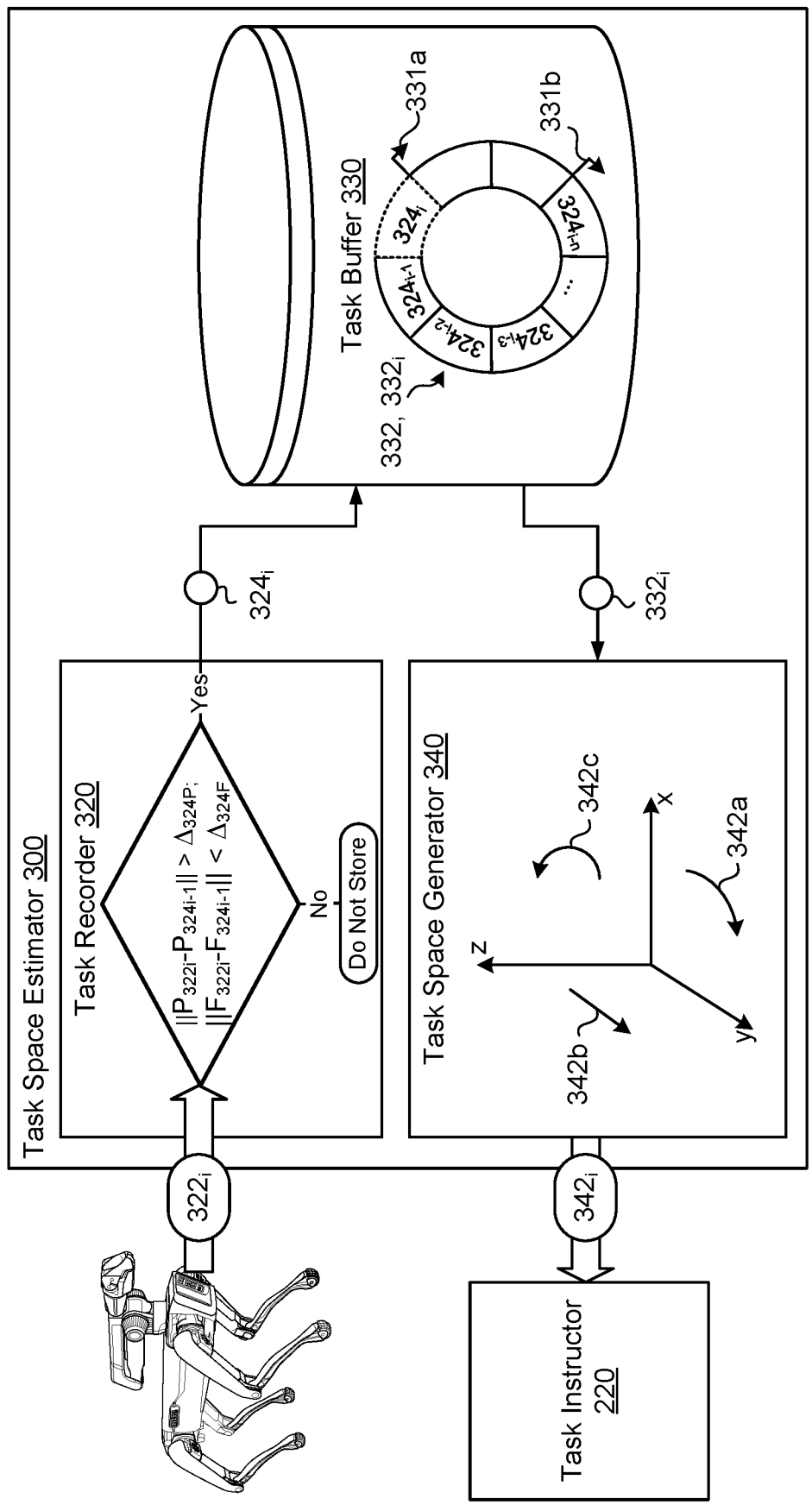
FIG. 3 is a schematic view of a task space estimator of the arm controller of FIG. 1A.

In FIGS. 1B and 3, a task recorder 320 receives each iteration of the measured task parameter set 322 and analyzes the received iteration of the measured task parameter set $322_i$ to determine whether to store the measured task parameter set $322_i$ as a new task parameter record 324 at a task buffer 330, e.g., residing on the memory hardware 38 of the robot 10. Generally, the task recorder 320 is configured to generate and store a new task parameter record 324 based on force parameters $F_{322}$ and/or position parameters $P_{322}$ of the measured task parameter set $322_i$. Thus, task parameter records 324 are not added to the task buffer 330 for every iteration of the measured task parameter set 322, but only when a value of one of the parameters of the measured task parameter set $322_i$ satisfies a recording threshold $\Delta_{324}$.

In one example, the task recorder 320 generates a new task parameter record 324 based on a measured position parameter $P_{322i}$. The task recorder 320 stores the first iteration of the measured task parameter set $322_{i1}$ as an initial task parameter record $324_{i+1}$. For subsequent iterations, the task recorder 320 compares the measured position parameter $P_{322i}$ of the received iteration of the measured task parameter set $322_i$ against a position parameter $P_{324i-1}$ of the last-stored task parameter record $324_{i-1}$ in the task buffer 330. The task recorder 320 generates and stores, in the task buffer 330, a new task parameter record $324_i$ when the measured position parameter $P_{322i}$ of the measured task parameter set $322_i$ is different from the stored position parameter $P_{324i-1}$ of the last-stored task parameter record $324_{i-1}$ by a position-based recording threshold $\Delta_{324P}$ set by the robot user. Thus, task parameter records 324 are not added to the task buffer 330 for every iteration of the task request 44, but only when the change in position exceeds the recording threshold $\Delta_{324P}$.

Additionally or alternatively, the task recorder 320 may optionally generate and add task parameter records 324 based on the measured force parameter $F_{322i}$ of the measured task parameter set $322_i$. The task recorder 320 compares a measured force parameter $F_{322i}$ of the received iteration of the measured task parameter set $322_i$ against a stored force parameter $F_{324i-1}$ of the last-stored task parameter record $324_{i-1}$ in the task buffer 330. The task recorder 320 generates and stores a new task parameter record $324_i$ when the measured force parameter $F_{322i}$ of the measured task parameter set $322_i$ is different from the stored force parameter $F_{324i-1}$ of the last-stored task parameter record $324_{i-1}$ by a force-based recording threshold $\Delta_{324F}$ calibrated by the robot operator.

As with position-based recording, force-based recording results in records 324 being added to the task buffer 330 only when the record 324 represents movement along a path associated with the task (e.g, horizontal arc of a door, vertical arc of a switch). In other words, the force-based recording may filter measured task parameter set $322_i$ where the measured forces $F_{322i}$ are too high, as high forces may be associated with a constrained axis of the manipulated object 4. For example, where the task request 44 is associated with pulling a switch along a vertically-oriented arcuate switch path, the switch may have a known pull-force (i.e., the force threshold $F_{thresh}$) associated with the arcuate switch path.

Using position-based task parameter recording and/or force-based task parameter recording ensures that task parameter records 324 that are added to the task buffer 330 represent actual changes in position of the robot arm 20 along the axes of freedom of the object 4, which can then be evaluated by the task space generator 340 to determine actual movement of the robot arm 20 and the task space model 342. In contrast, using time-based or velocity-based storage may result in storage of a large number of records 324 associated with a relatively small change in position and/or undesired changes in position along constrained axes of the object 4.

Referring to FIG. 3, the task buffer 330 is configured as a circular buffer 330 having a fixed-sized queue and a first-in-first-out (FIFO) data characteristic. Thus, the task buffer 330 only stores a task parameter record set 332 including a predetermined number n of measured position parameter records 324. When a new task parameter record $324_i$ is added to the task buffer 330 by the task recorder 320, then the last task parameter record $324_{i-n}$ is deleted from the task buffer 330. In the illustrated example, the task parameter record set 332 includes six populated task parameter records $324_{i-n}$ arranged between a write pointer 331a and a read pointer 331b. New task parameter records 324 are added to vacant record slots in front of the write pointer 331a. As discussed below, the size of the task parameter record set 332 (i.e., the number of task parameter records 324) may be tuned by a user depending on desired characteristics of the task space model 342 and/or task instructions 222. Larger task parameter record sets 332 will provide a more complete representation of the task position history, but including too many task parameter records 324 may result in the older task parameter records 324 inaccurately representing the current trajectory of the end effector 24.

When a new task parameter record $324_i$ is added to the task buffer 330, the task space generator 340 obtains the current task parameter record set $332_i$ including the added task parameter record 324 and generates a task space model 342 based on the task parameter record set $332_i$. The task space generator 340 evaluates the task parameter record set $332_i$ to determine main axes or a plane along which the task parameter records 324 of the task parameter record set $332_i$ are best-fit. For example, in FIG. 3, the task space generator 340 may decompose the task parameter record set $332_i$, which includes the task parameter records 324 including translational (x, y, z) and/or rotational ($\Theta_x$, $\Theta_y$, $\Theta_z$) coordinates, into a lower-dimensional (e.g., one-dimensional, two-dimensional) task space model 342. The task space generator 340 may use singular value decomposition (SVD) to determine the axes or plane of freedom associated with the task parameter record set $332_i$. For example, where the task request 44 includes opening a door 4, the task space generator 340 decomposes the task parameter record set $332_i$ into a two-dimensional task space model 342a projected to the x-y plane of the workspace. In other examples, such as opening a drawer, the task space generator 340 generates a single-dimensional task space model 342b projected to a single axis of the workspace (e.g., the y-axis). In yet another example where the task request 44 is associated with turning a wheel or crank, the task space generator 340 generates a two-dimensional task space model 342c on the x-z plane.

Figure 2B:
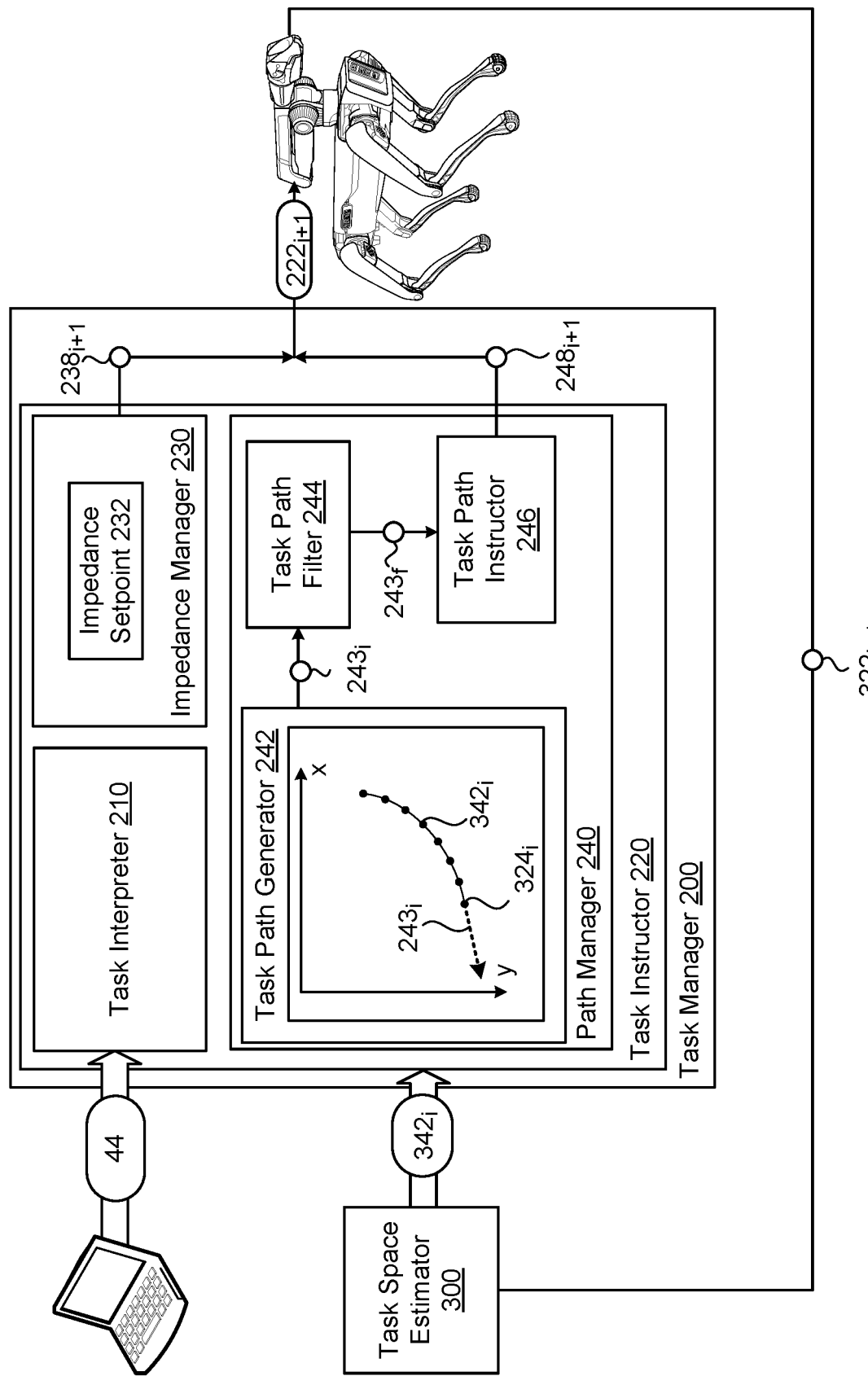
FIG. 2B is a schematic view of a task instructor of the arm controller of FIG. 1A.

Each iteration of the task space model $342_i$ is sent to or obtained by the task instructor 220, which uses the iteration of the task space model $342_i$ to generate a new iteration of task instructions $222_{i+1}$ for the robot arm 20. As shown in FIG. 2B, the task space model $342_i$ includes an arcuate path based on the task parameter record set $332_i$ (FIG. 3B) that is constrained to the x-y plane. Thus, as discussed previously, the task space model $342_i$ provides the path manager 240 with a lower-dimensional task space for determining a new iteration of task instructions $222_{i+1}$.

With reference to FIG. 2B, the path manager 240 includes a task path estimator 242 and a task path filter 244. The task path estimator 242 evaluates the task space model 342 and generates a task path model 243, $243_i$ representing the estimated task direction for the next iteration of the task instructions $222_{i+1}$. Generating the task path model $243_i$ for each iteration may include further decomposing the task space model $342_i$ into the lower-dimensional task path model 243 (i.e., from two-dimensional plane to one-dimensional axis). In one example, the task path model 243 includes a one-dimensional tangent to the two-dimensional task space model $342_i$. Here, the task path generator 242 extrapolates the task instructions 222 to determine the current location of the end effector 24. The tangent is then taken at the point of the task space model $342_i$ associated with the current position of the end effector 24.

The task path filter 244 determines whether the task path model $243_i$ complies with a path model quality threshold. For example, the task path filter 244 may compare or fit the task path model $243_i$ to a previous iteration of the task path model $243_{i-1}$ and/or the task space model $342_i$ to determine the quality of the task path model $243_i$. Where the task path model $243_i$ exceeds a threshold value (e.g. an error value), the task path filter 244 may discard the current iteration of the task path model $243_i$ and select the previous iteration of the task path model $243_{i-1}$.

The task path filter 244 sends the filtered task path model 243f (i.e., either current or previous iteration of the task path model $243_i$, $243_{i-1}$) to the task path instructor 246, which generates new path parameters $248_{i+1}$ for the robot arm 20. The new path parameters $248_{i+1}$ are based on the lower-dimensional filtered task path model 243f and include force or position parameters for moving the end effector 24 along the direction of the filtered task path model 243f. Thus, the task path instructor 246 simply applies a force along the direction tangent to the path (e.g., door arc) associated with the task request 44. By decomposing the measured task parameter sets 322 (e.g., three-dimension) into the task space model 342 (e.g., two-dimensional) and then into the task path model 243 (e.g., one-dimensional), the task instructor 220 can quickly compute the task instructions 222 for manipulating the constrained object 4 by applying forces only along the axes of freedom of the object 4.

The impedance manager 230 receives or obtains the task space model $342_i$ from the task space estimator 300 and determines the impedance (i.e., stiffness) of the end effector 24 of the robot arm 20 for the current task request 44. Generally, the impedance manager 230 is configured to evaluate the task space model $342_i$ and to assign lower impedance to the end effector 24 along axes that the arm controller 100 expects the end effector 24 to travel and to assign higher impedance along axes that the arm controller 100 expects the end effector 24 to be constrained. Thus, in the present example where the task space model $342_i$ lies along the x-y plane, the impedance manager 230 assigns relatively low impedance values (i.e., joint stiffness) to the end effector 24 along the x-axis and the y-axis. Conversely, the impedance manager 230 assigns a relatively high impedance value (i.e., stiffness) along the z-axis since the task space model $342_i$ indicates that the object 4 is constrained along z-direction. Assigning low impedance values along the free axes of the task space model $342_i$ and high impedance values along the constrained axes of the task space model $342_i$ allows the end effector 24 to rotate or pivot along the task path as the arm 20 executes the task request 44 (e.g., opening the door) while maintaining stiffness along directions that are not expected to have movement.

In addition to evaluating the task path model $243_i$ to determine the next iteration of impedance parameters $238_{i+1}$, the impedance manager 230 may consider other inputs in determining the impedance parameters $238_{i+1}$. For example, the impedance manager 230 may select impedance parameters $238_{i+1}$ based on the impedance setpoint 232 provided by the user. Additionally or alternatively, the impedance manager 230 may consider the input task parameters 48b received from the remote device 40. Where the impedance manager 230 does not receive or obtain the task space model 342, such as in the first iteration of task instructions $222_{i+1}$, or where the impedance manager 230 has a relatively low confidence in the task space model 342, such as when the task space model 342 has a high level of noise or inconsistent task parameter records 324, the impedance manager 230 may give greater weight to the impedance setpoint 232 and/or the input task parameters 48b to determine the impedance values for the next iteration of impedance parameters $238_{i+1}$. For example, where the user selects a leftward direction 48b corresponding to the x-y plane for the force and the impedance manager 230 does not have a task path model $243_i$, the impedance manager 230 will determine and assign impedance values based on the task input 48b and/or the impedance setpoint 232.

The new iteration of the impedance parameters $238_{i+1}$ and the path parameters $248_{i+1}$ based on the current iteration of the task space model $342_i$ are sent to the robot arm 20 as a new iteration of task instructions $222_{i+1}$. As provided above, the path parameters $248_{i+1}$ simply instruct the robot arm 20 to move the end effector 24 along the free direction of lower-dimensional task path model 243 while the impedance parameters $238_{i+1}$ instruct the end effector 24 to have a low stiffness along the modeled task space model 342 and a high stiffness transverse to the modeled task space model 342. Thus, the task instructions $222_{i+1}$ allow the end effector 24 to execute the task request 44 with minimal computation required at arm controller 100 by allowing the end effector 24 to follow the constrained path of the object 4 associated with the task request 44 (e.g., door arc, wheel circle, drawer axis). After the robot 10 executes the task instructions $222_{i+1}$, a new iteration of a measured task parameter set $322_{i+1}$ is transmitted to the task space estimator 300 for evaluation and generating an updated iteration of the task space model $342_{i+1}$.

Figure 4A:
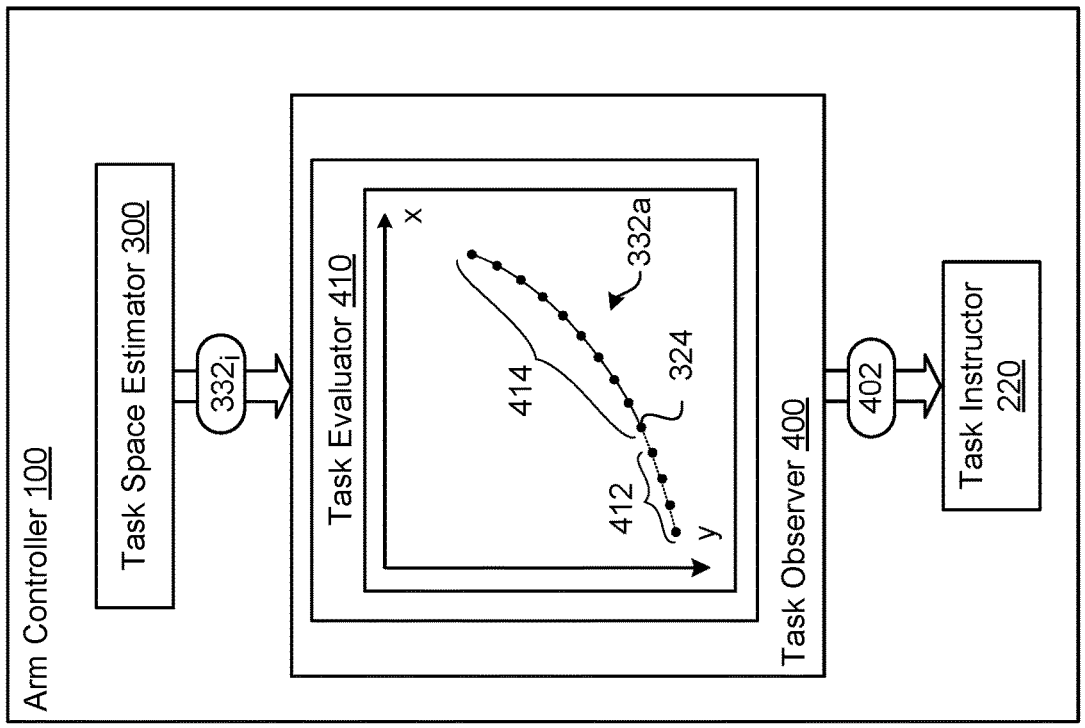
FIG. 4A is a schematic view of an example operation of a task observer of the arm controller of FIG. 1A.

Referring to FIGS. 1B and 4A, the task observer 400 is configured to continuously evaluate the measured task parameter set 322 (e.g., position, speed) of the end effector 24 to determine whether the end effector 24 is still engaged with the constrained object 4. The task observer 400 then generates a task status 402 identifying whether the end effector 24 is engaged and transmits the task status 402 to the task instructor 220. When the task status 402 indicates that the end effector 24 is disengaged from the constrained object 4, the task instructor 220 may terminate the task request 44 and cease generating new task instructions 222 and revert to a safe stopping behavior until the end effector 24 can be reengaged with the object 4.

Generally, the task observer 400 evaluates the most-recent task parameter records $324_i$ and determines the task status 402 based on whether the measured position $P_{322}$ and/or velocity $V_{322}$ of the end effector 24 satisfies task criteria. For example, the task observer 400 may evaluate the task parameter records 324 to determine whether the end effector 24 fits the task space model 342 and/or satisfies a velocity threshold $V_{thresh}$.

In FIG. 4A, the task observer 400 includes a task evaluator 410 that receives the current task parameter record set $332_i$ and/or the task space model $342_i$ including the task parameter records 324. The task evaluator 410 may segregate the task parameter records 324 into an evaluation record set 412 including a number of the most-recent task parameter records 324 and a model record set 414 including a number of the records 324 immediately preceding the records 324 selected for the evaluation record set 412. In the illustrated example, the evaluation record set 412 includes the four most-recent task parameter records 324 and the model record set 414 includes the ten task parameter records 324 preceding the evaluation record set 412. However, the task evaluator 410 may be tuned to select any number of records 324 for the evaluation record set 412 and the model record set 414. The task evaluator 410 checks a fit of the evaluation record set 412 against the model record set 414. When the quality of the fit of the evaluation record set 412 exceeds a fit quality threshold, the task evaluator 410 determines that the end effector 24 is disengaged (e.g., lost grip) from the constrained object 4.

Figure 4C:
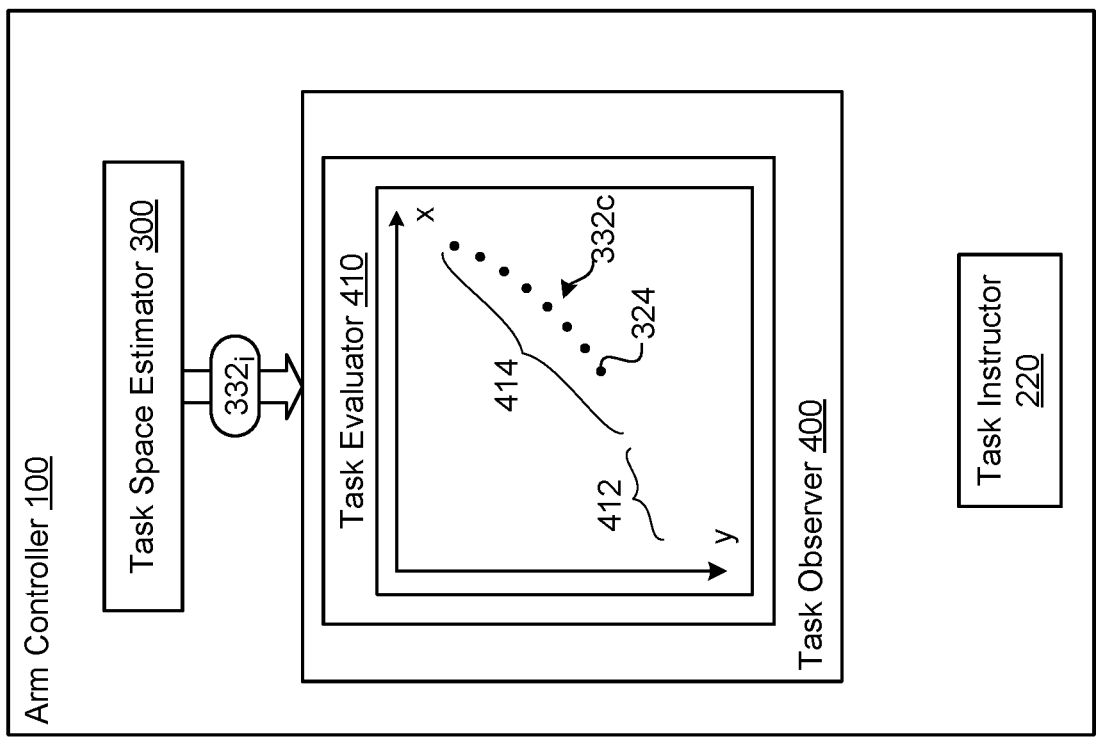
FIG. 4C is a schematic view of another example operation of the task observer of FIG. 4A.
Figure 4B:
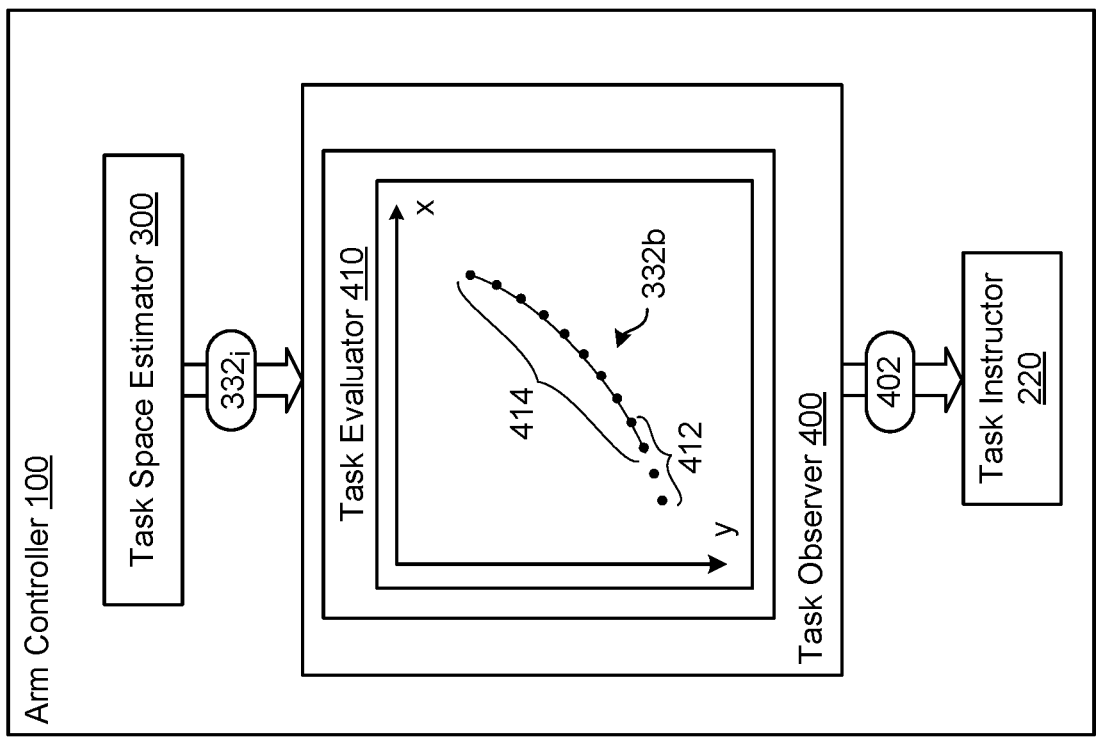
FIG. 4B is a schematic view of another example operation of the task observer of FIG. 4A.

The task evaluator 410 may be configured to determine a quality of the current iteration of the task parameter record set $332_i$ and to evaluate the task parameter record set $332_i$ based on the quality. For example, as previously discussed, the task evaluator 410 segregates the task parameter records set $332_i$ into an evaluation record set 412 including a first number of task parameter records 324 and a model record set 414 including a second number of task parameter records 324. The task evaluator 410 determines the quality of the task parameter record set $332_i$ based on whether the task parameter record set $332_i$ includes a quantity of task parameter records 324 needed to populate the evaluation record set 412 and the model record set 414. Depending on the number of records 324 in the task parameter record set $332_i$, the task evaluator 410 designates the task parameter record set $332_i$ as an optimal task parameter record set 332a (FIG. 4A), a sufficient record set 332b (FIG. 4B), or an insufficient task parameter record set 332c (FIG. 4C).

In the present example, the evaluation record set 412 includes four (4) slots for task parameter records 324 and the model record set 414 includes ten (10) slots for task parameter records 324. The task evaluator 410 determines that a task parameter record set $332_i$ is an optimal task parameter record set 332a (FIG. 4A) when the task parameter record set $332_i$ includes enough task parameter records 324 to populate each of the record sets 412, 414 with unique task parameter records 324 (i.e., no shared task parameter records between record sets 412, 414). Thus, in the present example, an optimal task parameter record set 332a includes at least fourteen (14) task parameter records 324 for uniquely populating the record sets 412, 414, as shown in FIG. 4A.

In another scenario (FIG. 4B), the task evaluator 410 determines that a current iteration of the task parameter record set $332_i$ is a sufficient task parameter record set 332b (i.e., less than optimal) when the task parameter record set $332_i$ includes at least enough task parameter records 324 to populate each of the evaluation record set 412 and the model record set 414, but with some of the task parameter records 324 of the sufficient task parameter record set 332b being shared between the record sets 412, 414. For example, where a sufficient task parameter record set 332b includes twelve (12) task parameter records 324 (FIG. 4B), the evaluation record set 412 is populated with the four most-recent task parameter records 324 (e.g., records 1-4) and the model record set 414 is populated with the ten (10) oldest records (e.g., records 3-12) such that the third and fourth records 324 of the sufficient task parameter record set 332b are included in both record sets 412, 414.

In another scenario (FIG. 4C), the task evaluator 410 determines that a current iteration of the task parameter record set $332_i$ is an insufficient task parameter record set 332c (i.e., cannot be evaluated) when the task parameter record set $332_i$ does not include enough task parameter records 324 to populate the model record set 414 and provide at least one unique record to the evaluation record set 412. In the present example, the task parameter record set 332i would need at least eleven task parameter records 324 to populate the ten (10) slots of the model record set 414 and provide one (1) unique record to the evaluation record set 412. For example, where an insufficient task parameter record set 332c includes eight (8) task parameter records 324 (FIG. 4C), the task evaluator 410 will not evaluate the task parameter record set 332c. If the task parameter record set $332_i$ is an insufficient task parameter record set 332c, the task observer 400 does not evaluate the insufficient task parameter record set 332c.

With respect to FIG. 4A, where the positions included in the task parameter records 324 of evaluation record set 412 do not fit the model record set 414, the task observer 400 determines that the end effector 24 has prematurely disengaged the constrained object 4 (i.e., lost grip) and generates a task status 402 indicating that end effector 24 has failed to complete the task request 44. In some examples, the task observer 400 evaluates the overall quality of a fit of the evaluation record set 412 by determining the mean squared error of the fit of the evaluation record set 412 to the model record set 414. Where the mean squared error exceeds a threshold fit error value, the task observer 400, generates the task status 402 indicating that the end effector 24 has become disengaged from the constrained object 4. Additionally or alternatively, the task observer 400 may determine that the end effector 24 has disengaged the object 4 when a measured speed or velocity $V_{322}$ of the end effector 24 exceeds a threshold velocity $V_{thresh}$. The threshold velocity $V_{thresh}$ may be a fixed value or may be based on the measured velocities $V_{322}$ included in the task parameter records 324 of the model record set 414.

Figure 5:
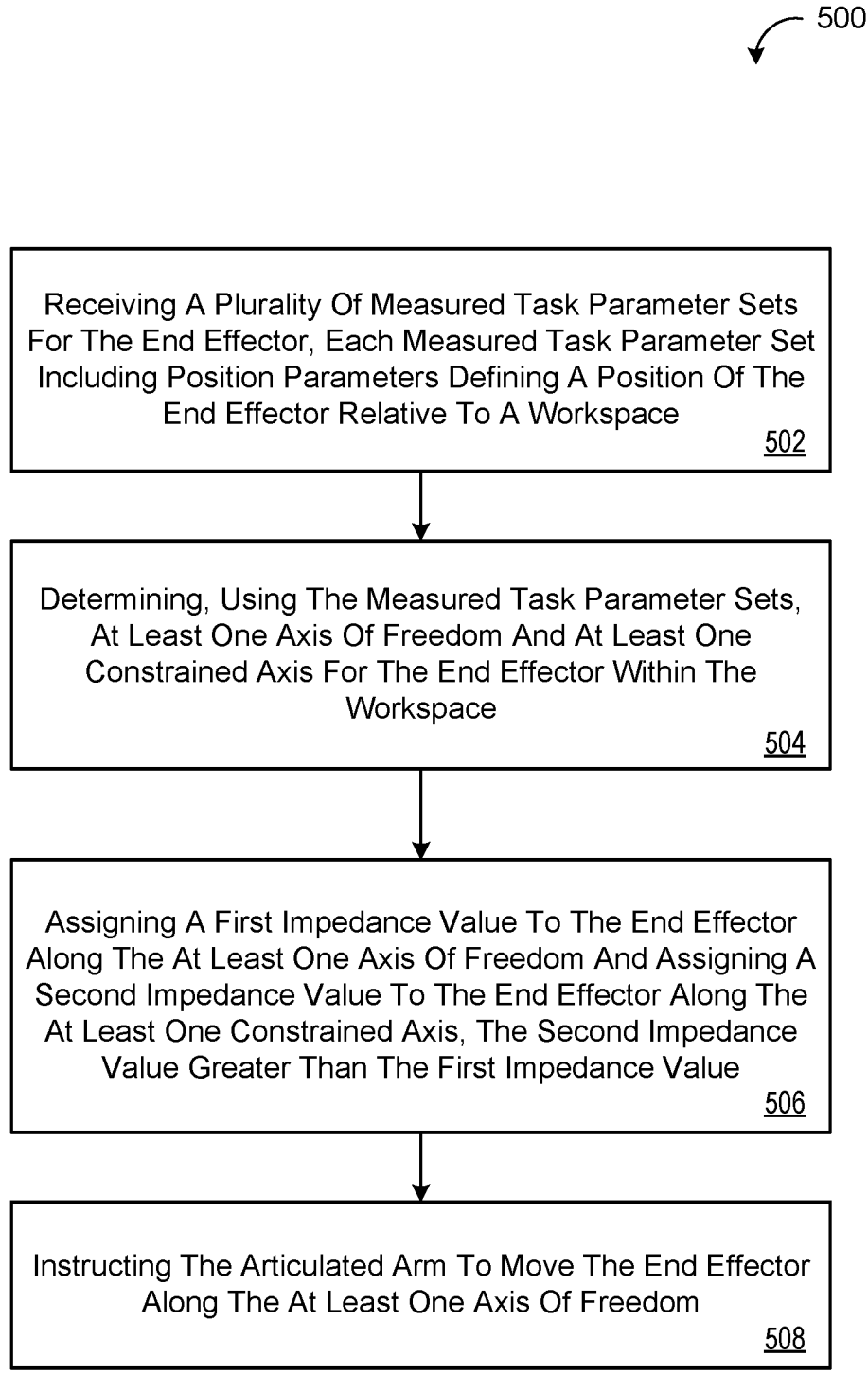
FIG. 5 is a flowchart of an example arrangement of operations for a method of constrained object manipulation for in a robot arm.

FIG. 5 is a flowchart of an example arrangement of operations for a method 500 for manipulating constrained objects using a robot arm 20. The method 500 may be a computer implemented method executed by data processing hardware of the robot 10, which causes the data processing hardware to perform operations. At operation 502, the method 500 includes receiving a plurality of measured task parameter sets 322 for the end effector 24, each measured task parameter set 322 including position parameters $P_{322}$ defining a position of the end effector 24 relative to a workspace 2. The method 500, at operation 504, also includes determining, using the measured task parameter sets 322, at least one axis of freedom x, y, z, $\Theta_x$, $\Theta_y$, $\Theta_z$ and at least one constrained axis x, y, z, $\Theta_x$, $\Theta_y$, $\Theta_z$ for the end effector 24 within the workspace 2. Another operation 506 of the method includes assigning a first impedance value 238 to the end effector 24 along the at least one axis of freedom x, y, z, $\Theta_x$, $\Theta_y$, $\Theta_z$ and assigning a second impedance value 238 to the end effector 24 along the at least one constrained axis x, y, z, $\Theta_x$, $\Theta_y$, $\Theta_z$, the second impedance value 238 greater than the first impedance value 238. At operation 508, the method 500 includes instructing the articulated arm 20 to move the end effector 24 along the at least one axis of freedom x, y, z, $\Theta_x$, $\Theta_y$, $\Theta_z$.

Figure 6:
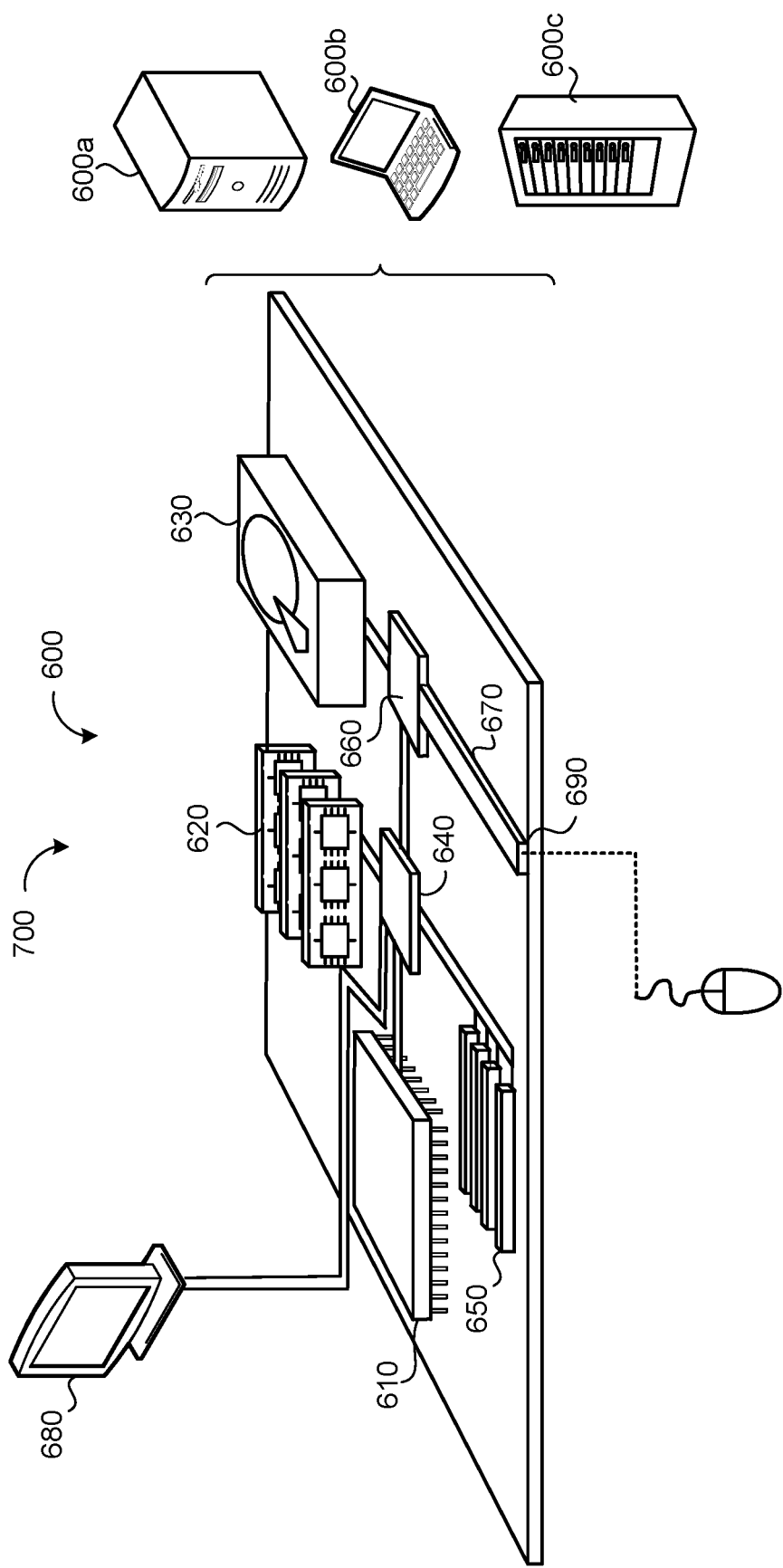
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product 700 is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof.

These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that, when executed by data processing hardware of a robot including an articulated arm having an end effector engaged with a constrained object having at least one constrained axis and at least one axis of freedom, causes the data processing hardware to perform operations comprising:
    receiving a measured task parameter set for the end effector, the measured task parameter set including position parameters defining a position of the end effector;
    identifying, using the measured task parameter set, the at least one axis of freedom and the at least one constrained axis for the constrained object;
    assigning a first impedance value to the end effector along the at least one axis of freedom of the constrained object and assigning a second impedance value to the end effector along the at least one constrained axis of the constrained object, the second impedance value indicating a greater amount of impedance than the first impedance value; and
    instructing the articulated arm to move the end effector along the at least one axis of freedom.

2. The method of claim 1, wherein identifying the at least one axis of freedom and the at least one constrained axis comprises determining a task space model for the constrained object using the measured task parameter set, and wherein assigning the first and second impedance values to the end effector along the at least one axis of freedom and the at least one constrained axis of the constrained object is based on the task space model.

3. The method of claim 1, wherein the operations further comprise storing at least a portion of the measured task parameter set in a task buffer as task parameter records.

4. The method of claim 3, wherein storing at least a portion of the measured task parameter set comprises:
    comparing at least one measured parameter from the measured task parameter set to a recorded parameter of one of the task parameter records of the task buffer; and
    generating a new task parameter record when a difference between the at least one measured parameter and the recorded parameter satisfies a recording threshold.

5. The method of claim 4, wherein the measured parameter and the recorded parameter each include a respective position parameter and/or a respective velocity parameter.

6. The method of claim 5, wherein the operations further comprise evaluating the position parameters of the task parameter records to identify the at least one axis of freedom associated with the task parameter records.

7. The method of claim 3, wherein the operations further comprise evaluating the task parameter records to determine whether the end effector is engaged with the constrained object.

8. The method of claim 1, wherein the operations further comprise:
    receiving a task request to control the end effector of the articulated arm to manipulate the constrained object;

determining one or more initial impedance parameters based on the task request; and instructing the articulated arm to move the end effector to manipulate the constrained object based on the task request and the one or more initial impedance parameters, wherein the position parameters further define the position of the end effector as the end effector manipulates the constrained object.

9. A robot comprising:

an articulated arm having an end effector for engaging a constrained object having at least one constrained axis and at least one axis of freedom;

data processing hardware in communication with the articulated arm; and memory hardware in communication with the data processing hardware, the memory hardware storing instructions that when executed on the data processing hardware cause the data processing hardware to perform operations comprising:

receiving a measured task parameter set for the end effector, the measured task parameter set including position parameters defining a position of the end effector;

identifying, using the measured task parameter set, the at least one axis of freedom and the at least one constrained axis for the constrained object;

assigning a first impedance value to the end effector along the at least one axis of freedom of the constrained object and assigning a second impedance value to the end effector along the at least one constrained axis of the constrained object, the second impedance value indicating a greater amount of impedance than the first impedance value; and instructing the articulated arm to move the end effector along the at least one axis of freedom.

10. The robot of claim 9, wherein identifying the at least one axis of freedom and the at least one constrained axis comprises determining a task space model for the constrained object using the measured task parameter set, and wherein assigning the first and second impedance values to the end effector along the at least one axis of freedom and the at least one constrained axis of the constrained object is based on the task space model.

11. The robot of claim 9, wherein the operations further comprise storing at least a portion of the measured task parameter set in a task buffer as task parameter records.

12. The robot of claim 11, wherein storing at least a portion of the measured task parameter set comprises:

comparing at least one measured parameter from the measured task parameter set to a recorded parameter of one of the task parameter records of the task buffer; and generating a new task parameter record when a difference between the at least one measured parameter and the recorded parameter satisfies a recording threshold.

13. The robot of claim 12, wherein the measured parameter and the recorded parameter each include a respective position parameter and/or a respective velocity parameter.

14. The robot of claim 13, wherein the operations further comprise evaluating the position parameters of the task parameter records to identify the at least one axis of freedom associated with the task parameter records.

15. The robot of claim 11, wherein the operations further comprise evaluating the task parameter records to determine whether the end effector is engaged with the constrained object.

16. A computer program product encoded on a non-transitory computer readable storage medium connected to a robot including an articulated arm having an end effector for engaging a constrained object having at least one constrained axis and at least one axis of freedom, the computer program product comprising instructions that when executed by a data processing apparatus cause the data processing apparatus to perform operations comprising:

receiving a measured task parameter set for the end effector, the measured task parameter set including position parameters defining a position of the end effector;

identifying, using the measured task parameter set, the at least one axis of freedom and the at least one constrained axis for the constrained object;

assigning a first impedance value to the end effector along the at least one axis of freedom of the constrained object and assigning a second impedance value to the end effector along the at least one constrained axis of the constrained object, the second impedance value indicating a greater amount of impedance than the first impedance value; and instructing the articulated arm to move the end effector along the at least one axis of freedom.

17. The product of claim 16, wherein identifying at the least one axis of freedom and the at least one constrained axis comprises determining a task space model for the constrained object using the measured task parameter set, and wherein assigning the first and second impedance values to the end effector along the at least one axis of freedom and the at least one constrained axis of the constrained object is based on the task space model.

18. The product of claim 16, wherein the operations further comprise storing at least a portion of the measured task parameter set in a task buffer as task parameter records.

19. The product of claim 18, wherein storing at least the portion of the measured task parameters set comprises:

comparing at least one measured parameter from the measured task parameter set to a recorded parameter of one of the task parameter records of the task buffer; and generating a new task parameter record when a difference between the at least one measured parameter and the recorded parameter exceeds a recording threshold.

20. The product of claim 19, wherein the measured parameter and the recorded parameter each include a respective position parameter and/or a respective velocity parameter.

21. The product of claim 18, wherein the operations further comprise evaluating the position parameters of the task parameter records to identify the at least one axis of freedom associated with the task parameter records.

22. The product of claim 18, wherein the operations further comprise evaluating the task parameter records to determine whether the end effector is engaged with the constrained object.

* * * * *